United States Patent
Christian et al.

(10) Patent No.: US 7,962,631 B2
(45) Date of Patent: Jun. 14, 2011

(54) METHOD FOR DETERMINING NETWORK PROXIMITY FOR GLOBAL TRAFFIC LOAD BALANCING USING PASSIVE TCP PERFORMANCE INSTRUMENTATION

(75) Inventors: Michael F. Christian, Pacifica, CA (US); David Apgar, San Francisco, CA (US); Jayanth Vijayaraghavan, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 256 days.

(21) Appl. No.: 11/963,700

(22) Filed: Dec. 21, 2007

(65) Prior Publication Data
US 2009/0164646 A1 Jun. 25, 2009

(51) Int. Cl.
*G06F 15/16* (2006.01)
(52) U.S. Cl. ...................................................... 709/228
(58) Field of Classification Search .................. 709/225, 709/228
See application file for complete search history.

(56) References Cited

U.S. PATENT DOCUMENTS

| | | | |
|---|---|---|---|
| 6,665,702 | B1 | 12/2003 | Zisapel et al. |
| 7,007,089 | B2 * | 2/2006 | Freedman ..................... 709/225 |
| 7,139,840 | B1 | 11/2006 | O'Toole |
| 7,159,034 | B1 | 1/2007 | Rai |
| 7,333,794 | B2 | 2/2008 | Zappala |
| 7,512,702 | B1 | 3/2009 | Srivastava et al. |
| 2002/0038360 | A1 | 3/2002 | Andrews et al. |
| 2002/0059622 | A1 | 5/2002 | Grove et al. |
| 2002/0127993 | A1 | 9/2002 | Zappala |
| 2002/0152309 | A1 | 10/2002 | Gupta et al. |
| 2003/0072270 | A1 | 4/2003 | Guerin et al. |
| 2003/0079027 | A1 | 4/2003 | Slocombe et al. |
| 2003/0099203 | A1 | 5/2003 | Rajan et al. |
| 2003/0133410 | A1 | 7/2003 | Kang et al. |
| 2005/0010653 | A1 | 1/2005 | McCanne |
| 2005/0188073 | A1 * | 8/2005 | Nakamichi et al. ........... 709/223 |

(Continued)

FOREIGN PATENT DOCUMENTS
KR 10-2005-0055305 A 6/2005

OTHER PUBLICATIONS

PCT Office, Written Opinion of the International Searching Authority and International Search Report, PCT/US2008/086700; Mailing date: Jun. 25, 2009, 7 pages.

(Continued)

*Primary Examiner* — Ario Etienne
*Assistant Examiner* — Hee Soo Kim
(74) *Attorney, Agent, or Firm* — Hickman Palermo Truong & Becker LLP

(57) ABSTRACT

Techniques are described for measuring TCP connection quality between a client and a plurality of data centers. A small amount of code, called a web beacon, is placed onto production web pages. When a client requests the production web page, the web page is served to the client. When the web page code is processed, the web beacon instructs the client to retrieve zero-content images from a plurality of data centers through TCP connections in the background. As each connection is made, a passive monitoring system measures and logs statistics about each TCP connection from the client to the data center. The statistics are aggregated into a database and may be sorted based upon ranges of IP addresses of clients and the connection quality measurements. The data is exported from the database to global load balancers to determine routing from subsequent clients to the plurality of data centers.

28 Claims, 4 Drawing Sheets

| | Client | Colocation A | Colocation B | Colocation C |
|---|---|---|---|---|
| | 300 | 302 | 304 | 306 |
| 308 | 1.1.1.0/24 | 10 ms | 50 ms | 80 ms |
| 310 | 2.2.2.0/26 | 100 ms | 40 ms | 5 ms |
| 312 | 3.3.3.0/24 | 300 ms | 1 ms | 500 ms |

U.S. PATENT DOCUMENTS

| | | |
|---|---|---|
| 2006/0123340 A1 | 6/2006 | Bailey et al. |
| 2006/0193252 A1 | 8/2006 | Naseh et al. |
| 2006/0235972 A1 | 10/2006 | Asnis |
| 2007/0036146 A1 | 2/2007 | Adkins et al. |
| 2007/0060102 A1 | 3/2007 | Immonen et al. |
| 2008/0052387 A1 | 2/2008 | Heinz et al. |
| 2008/0052393 A1 | 2/2008 | McNaughton et al. |
| 2008/0052394 A1 | 2/2008 | Bugenhagen et al. |
| 2008/0052401 A1 | 2/2008 | Bugenhagen et al. |
| 2008/0167886 A1 | 7/2008 | Marcken |
| 2009/0100128 A1 | 4/2009 | Czechowski et al. |
| 2009/0164646 A1 | 6/2009 | Christian et al. |
| 2009/0245114 A1 | 10/2009 | Vijayaraghavan |

OTHER PUBLICATIONS

Current pending claims for PCT Application No. PCT/US2008/086700, 4 pages.

PCT Office, Written Opinion of the International Searching Authority and International Search Report, PCT Application No. PCT/US2008/086704, Mailing date: Jun. 16, 2009, 7 pages.

Current pending claims for PCT Application No. PCT/US2008/086704, 4 pages.

PCT Office, Written Opinion of the International Searching Authority and International Search Report, PCT/US2008/088158; Mailing date: Jul. 8, 2009, 9 pages.

Current pending claims for PCT Application No. PCT/US2008/088158, 4 pages.

PCT Office, Written Opinion of the International Searching Authority and International Search Report, PCT/US2009/038969; Mailing date: Dec. 23, 2009, 12 pages.

Current pending claims for PCT Application No. PCT/US2009/038969, 4 pages.

* cited by examiner

FIG. 3

| Client | Colocation A | Colocation B | Colocation C |
|---|---|---|---|
| 1.1.1.0/24 | 10 ms | 50 ms | 80 ms |
| 2.2.2.0/26 | 100 ms | 40 ms | 5 ms |
| 3.3.3.0/24 | 300 ms | 1 ms | 500 ms |

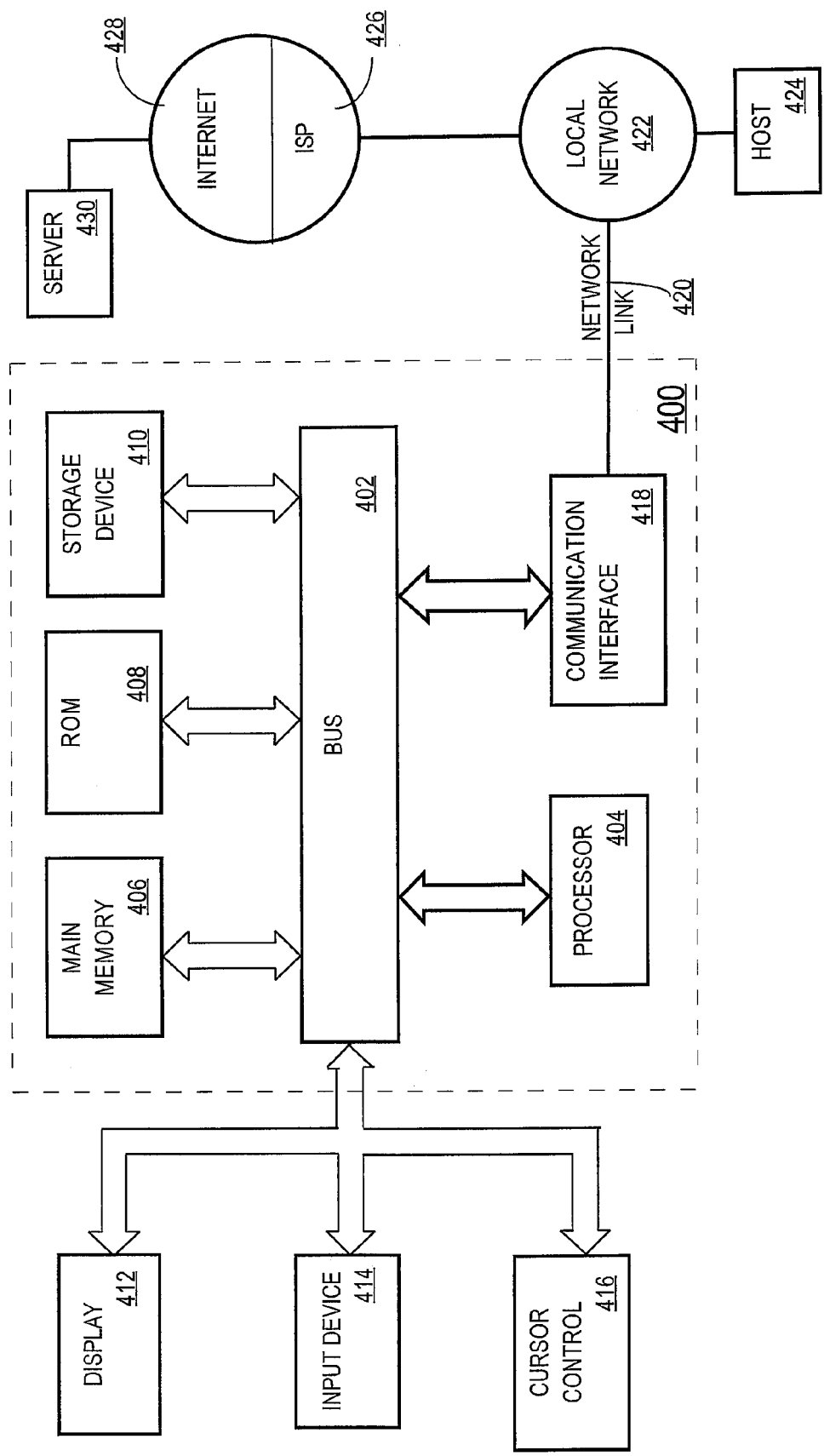

METHOD FOR DETERMINING NETWORK PROXIMITY FOR GLOBAL TRAFFIC LOAD BALANCING USING PASSIVE TCP PERFORMANCE INSTRUMENTATION

FIELD OF THE INVENTION

The present invention relates to TCP connections, and more specifically, to determining connection quality of TCP connections.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As used herein, the term "data center" refers to a colocation of associated servers. The servers that belong to a particular data center are within the same building or complex but data centers are typically located geographically distant from each other. The geographic distance adds protection so that catastrophic failure in one data center caused by a natural disaster would not also cause failure in the other data center. For example, one data center might be located on the East Coast in New York and another data center might be located on the West Coast in San Francisco.

Global load balancing or "GLB," is a mechanism for distributing client access to particular services across a plurality of servers. For example, in a situation in which a particular service is provided by servers that belong to data centers in New York and San Francisco, GLB might distribute client access so that the number of clients connected to the data center in New York is about the same as the number of clients connected to the data center in San Francisco.

When used in the context of the Internet, GLB may use a variety of active and passive monitoring techniques to generate a complex map of the Internet. Based upon this map, GLB makes traffic routing decisions to connect a client to the "closest" server. As used herein, "close" does not necessarily mean basing the determination only on geographic proximity. As used herein, a "close" server is a server that results in the fastest connection to the client. Thus, if a server that was located 100 miles away were slower for the client to reach than a server located 200 miles away because of heavy congestion, then GLB would route the client to the "closer" server that is 200 miles away.

Many active and passive monitoring mechanisms build a global map of Internet proximity for GLB. The protocols used by these mechanisms may include, but are not limited to, ICMP (ping), BGP (border gateway protocol), and manual entry. The Internet Control Message Protocol (ICMP) is one of the core protocols of the Internet. One important ICMP application is the ping tool. The ping tool sends and receives ICMP Echo Request and Response messages to determine whether a host is reachable and the length of time packets take to travel to and from the host. The Border Gateway Protocol (BGP) is the core routing protocol of the Internet. BGP works by maintaining a table of IP networks that designate network reachability among autonomous systems (AS). BGP makes routing decisions based on path, network policies, and rulesets. Unfortunately, these mechanisms and protocols are not able to monitor the actual performance of a web connection that employs the TCP protocol and thus accurate routing determinations for TCP connections may not be made.

Due to dynamic changes in topology and connectivity, GLB systems may have difficulty maintaining a full and accurate map of the Internet. Inaccuracies in the map may lead to incorrect routing decisions. Significant time may be required to correct these routing decisions based upon which mapping protocol is employed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a diagram displaying processed data grouped by netblock, according to an embodiment of the invention; and FIG. 4 is a block diagram of a computer system on which embodiments of the invention may be implemented.

DETAILED DESCRIPTION

Figure 1:
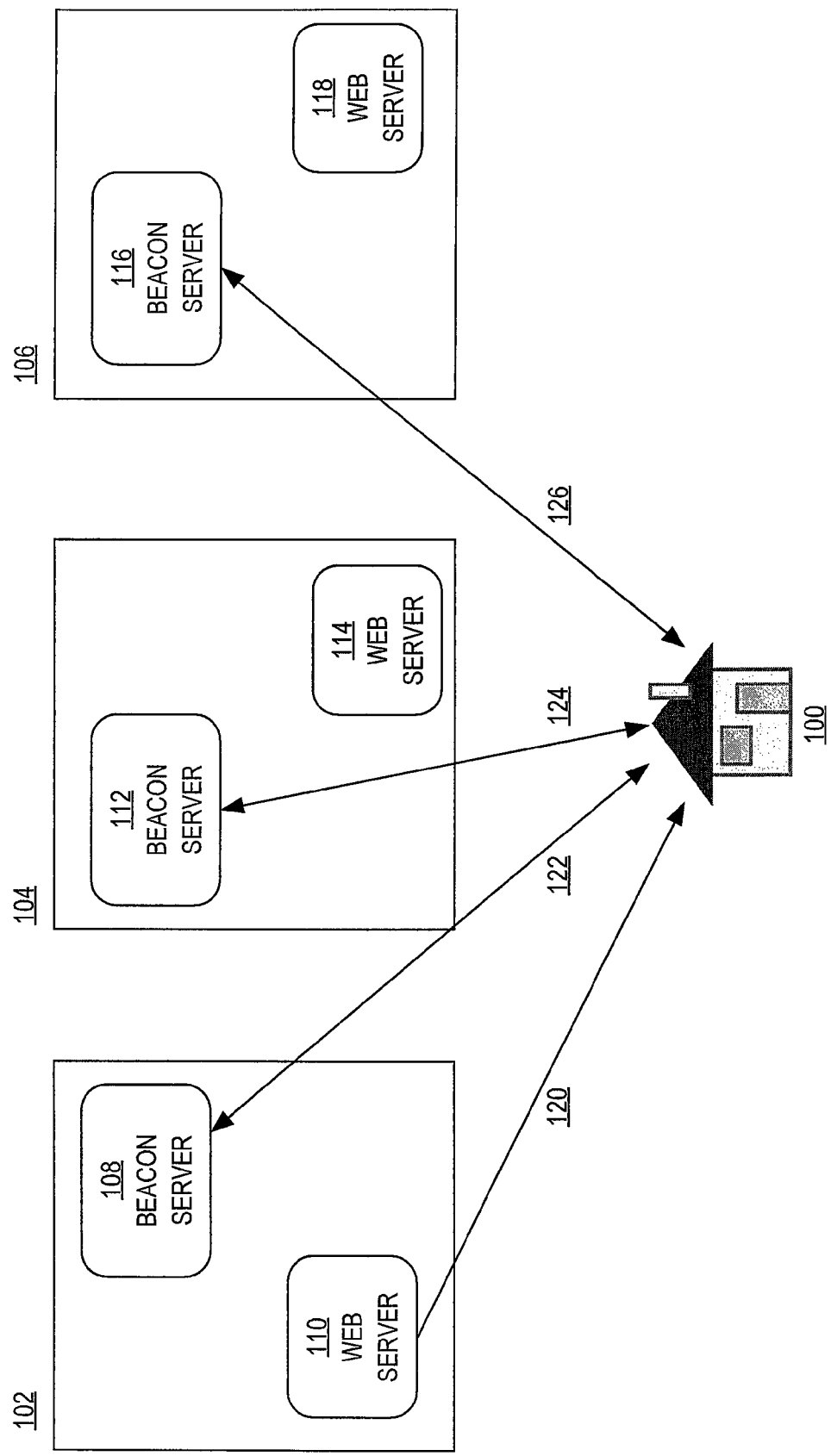
FIG. 1 is a diagram displaying a client connecting to web beacons located in different data centers, according to an embodiment of the invention.

Techniques are described to measure the connection quality of actual TCP connections and to use the measurement information in subsequent traffic routing decisions. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Transmission Control Protocol ("TCP") is an Internet protocol that allows applications on a networked host to create a connection to another host. For example, a client requesting a web page might represent one host and the server providing the web page content to the client might represent the other host.

The TCP protocol has many properties related to the connection between hosts. TCP guarantees reliable and in-order delivery of data from a sender to the receiver. In order to accomplish in-order delivery, TCP also provides for retransmitting lost packets and discarding duplicate packets sent. TCP is also able to distinguish data for multiple connections by concurrent applications (e.g., a web server and e-mail server) running on the same host.

To initiate a TCP connection, the two hosts exchange an initial sequence number. The initial sequence number identifies the order of the bytes sent from each host so that the data transferred remains in order regardless of any fragmentation or disordering that might occur during a transmission. For every byte transmitted, the sequence number is incremented.

Each byte sent is assigned a sequence number by the sender and then the receiver sends an acknowledgement back to the sender to confirm the transmission. For example, if computer A (the sender) sends 4 bytes with a sequence number of 50 (the four bytes in the packet having sequence numbers of 50, 51, 52, and 53 assigned), then computer B (the receiver) would send back to computer A an acknowledgement of 54 to indicate the next byte computer B expects to receive. By sending an acknowledgement of 54, computer B is signaling that bytes 50, 51, 52, and 53 were correctly received. If, by some chance, the last two bytes were corrupted then computer B sends an acknowledgement value of 52 because bytes 50 and 51 were received successfully. Computer A would then re-send to computer B data beginning with sequence number 52.

TCP is also able to perform congestion control. For example, TCP might adjust the rate of data entering the network, keeping the data flow below a rate that would cause network congestion problems. Acknowledgments received for data sent, or the lack of acknowledgments received, are measured by senders to interpret network conditions between the sender and receiver. TCP senders and receivers may then alter the rate of data flow according to the network conditions encountered in order to ensure good traffic flow.

Unfortunately, measuring an actual TCP connection in order to ensure an accurate measure of connection quality may not be performed by third parties or non-TCP protocols. For example, using non-TCP protocols, such as ICMP, as a substitute for actual TCP connection measures might lead to inaccurate results. One reason is ICMP traffic often has a lower quality of service ("QoS") than that of TCP. QoS is the priority given to traffic on the Internet. QoS provides different priority to different data flows by guaranteeing a certain level of performance to a data flow in accordance with requests from the application. The QoS of ping traffic used by ICMP is given a lower priority than TCP because pinging is not guaranteed to always reach the ping's destination. In contrast, TCP guarantees that all traffic will reach a particular destination. As a result, some measures may be affected by a lower QoS such as, but not limited to, packet drop rates and queueing times being greater than normal. Thus routing decisions for TCP connections based on ICMP would be inaccurate.

Third party services have difficulties measuring TCP connection quality because TCP is a point-to-point protocol. In a point-to-point protocol, traffic is routed from one network point to another network point. For example, one network point might be a client requesting a web page and the other network point might be a server providing the web page to the client. A third party is only able to intercept TCP traffic from the point-to-point connection if the third party is on the network, between the two points of the connection, and is able to actively view all packets in the connection between the two parties. Thus, measurements of a TCP connection made by a third party service are very difficult and not practical.

Web Beacons and Passive Monitoring

In an embodiment, web beacons and passive server monitoring measure the connection quality of an actual TCP connection between a client and a server within a data center providing the client content. Web beacons are also known as pixel tags, clear GIFs, or zero-content images and are transparent or invisible graphic images, usually no larger than a 1×1 pixel.

In an embodiment, a web beacon is generated by placing a small amount of code, or beacon code, into production web pages. Clients request and are served the production web page from a web server in a data center. When the production web page is processed by the client, the beacon code causes the client browser to retrieve web beacons, or zero-content images, from a beacon server located in every potential data center location. For example, if there are three different colocations, or data centers, in the United States capable of serving the web page, with one colocation on the West Coast, another colocation on the East Coast, and another colocation in the Midwest, then the beacon code causes the client to request the web beacon, or zero-content image, from a beacon server located in each of the colocations with a TCP connection. The requests are performed in the background of the client so that there is no interference with the current production web page load from the web server.

In an embodiment, a passive monitoring system in a kernel module of the beacon server measures and logs statistics for the TCP connections between the client and the data center from web beacon retrieval. For example, network latency might be measured by timing the arrival and departure of packets during the TCP handshake sequence. As another example, packet loss ratios might be measured over the life of the TCP connection by counting the number of TCP re-transmits required by the connection. These two measures, network latency and packet loss rate, provide an excellent indication of the quality of the connection between the particular client and the particular data center. Any other measurements related to TCP connections may also be measured and logged by the passive monitoring system.

Because the measurements of the TCP connections from the web beacons are based upon actual web traffic from the data center to the client, accurate TCP connection quality measurements are ensured. These measurements may then be used to subsequently make intelligent global traffic routing decisions to connect the "closest" server in a data center to a client.

A diagram illustrating web beacons and passive monitoring, according to an embodiment, is shown in FIG. 1. In FIG. 1, a client 100 may be routed to three different data centers. Data center 102 contains beacon server 108 and web server 110. Data center 104 contains beacon server 112 and web server 114. Data center 106 contains beacon server 116 and web server 118. Client 100 requests and receives a web page (transmission 120) from server 110. The web page served by the web server 110 contains beacon code that instructs the client 100 to retrieve a web beacon from web beacon servers located in each data center. As a result, client 100 requests a web beacon from beacon server 108 in data center 102 with request 122, a web beacon from beacon server 112 in data center 104 with request 124, and a web beacon from beacon server 116 in data center 106 with request 126. A TCP connection is made between client 100 and each beacon server 108, 112, and 116, in order to retrieve the web beacon. All of these requests for web beacons are made in the background of the client to not interfere with the page load by web server 110.

Passive monitoring systems in each of the beacon servers measures and logs statistics about the TCP connections made to retrieve the web beacons between client 100 and each beacon server 108, 112, and 116. The measures of the TCP connection are used to determine the quality between the client 100 and the data center that corresponds to each beacon server. The measurement data logged and recorded may vary from implementation to implementation. In an embodiment, measurement data includes, but is not limited to, round trip latency data and the packet loss rate data. The measures and statistics about each TCP connection for web beacons are stored by each beacon server.

Measuring TCP Connections Through Other Methods

Measuring the performance of TCP connections may also be performed using a variety of other methods. Beaconing, or directing a client to connect to a server, is used to measure the performance of a connection. A client may be directed to connect to a plurality of beacon servers. More than one beacon server is used so that multiple endpoints of the connection are measured. In addition, a client may be directed to connect to a particular beacon server based upon randomized selections of beacon servers. The beacon server may be a dedicated server that is dedicated to only measuring connection data. The beacon server may also be a server that is serving real traffic. Any type of TCP-based connection protocol, including, but not limited to FTP (File Transfer Protocol), HTTP (Hypertext Transfer Protocol), or IRC (Internet Relay Chat), may be used and any application that has a level of control over the locations to which a user connects may be used.

In an embodiment, an application is placed on the computer of a client. When the application is started or running, the application attempts a connection to a plurality of beacon servers. In another embodiment, for each occurrence a DNS request is made from a resolver, a response is sent for the client to connect to a plurality of beacon servers. The selection of beacon servers may vary from implementation to implementation. In an embodiment, the client is directed to connect to particular beacon servers based upon random selection methods. Even though random selection is used, the amount of data collected over time is enough such that the random selection method nears the accuracy of having each client connect to a beacon server in every data center. Upon connection to any of the beacon servers, passive monitoring systems in each beacon server measures and logs statistics about the connection made from the client to the beacon server.

Aggregating and Processing Data

In an embodiment, a database collects TCP measurements along with related client IP addresses from the web beacon servers located in each data center. The data may be requested by the database server or sent periodically by each of the web beacon servers. The database may be located in a particular data center or remotely in a separate facility.

In an embodiment, the database server normalizes the data received from the beacon servers into sets of discrete netblocks. As used herein, a netblock is a range of client IP addresses. For example, the netblock "1.1.1.0" indicates all clients whose IP addresses begin with "1.1.1.x", where "x" may be any value between 0 and 255. Clients in the same netblock may use the same path to the data center. As a result, TCP connection measurements for clients in the same netblock may be aggregated to provide more complete information about a path from a particular client to a particular data center. To determine the best service destination, the connection performance of paths from each data center to each possible netblock is measured and maintained.

In an embodiment, a list of available servers or data centers is sorted by connection quality to each particular netblock. In another embodiment, the database server normalizes data based upon TCP statistics received from the beacon servers. Under this circumstance, connections are sorted based upon connection quality with a related IP address. In yet another embodiment, the database collects the measurement data and the corresponding IP address and performs no further processing on the data.

In an embodiment, the measurement-based data is exported from the database to distributed authoritative name servers acting as global load balancers. The measurement-based data provides the global load balancers information to make a proper decision about client routing. In an embodiment, the measurement-based data may be used exclusively by the global load balancer to determine client routing. In another embodiment, the measurement-based data is additional data considered by the global load balancer in order to make a routing decision.

Figure 2:
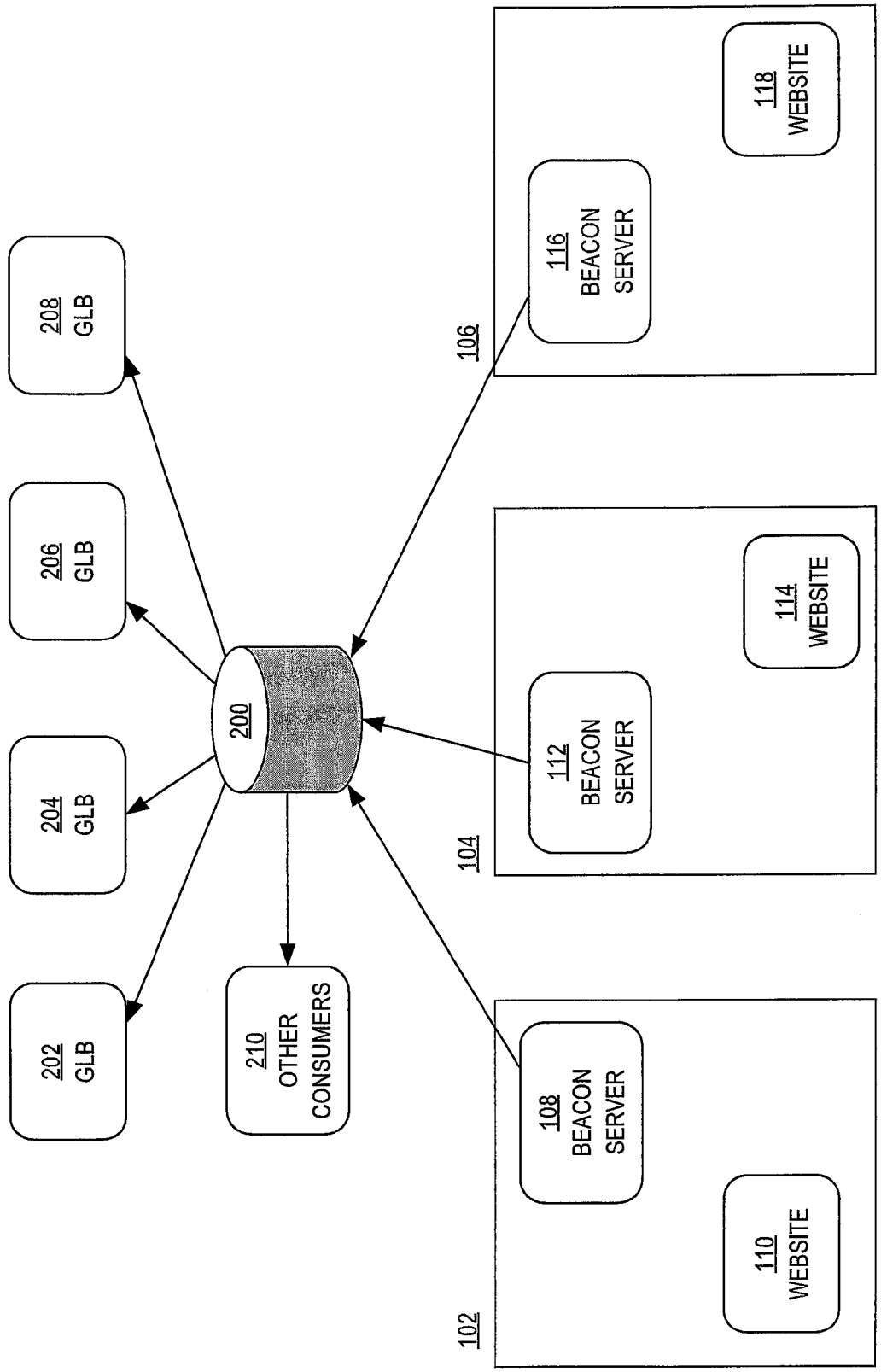
FIG. 2 is a diagram displaying data being aggregated from web beacons, and the processed data distributed to GLB servers, according to an embodiment of the invention.

A diagram illustrating a centralized database collecting TCP statistics from beacon servers, according to an embodiment, is shown in FIG. 2. In FIG. 2, beacon servers from the three data centers from FIG. 1 (beacon server 108 from data center 102, beacon server 112 from data center 104, and beacon server 116 from data center 106) send data to centralized database 200. Centralized database 200 aggregates and sorts the data based upon various criteria. The processed data is then sent to GLB 202, GLB 204, GLB 206, and GLB 208. In another embodiment, the processed data is sent form the centralized server 200 to other consumers 210. Other consumers includes applications other than web servers that may be housed in the data centers. For example, an Internet company may have a separate music or media application that allows clients to connect directly to the applications. Because these applications are contained in the same data center as the beacon server, the TCP data gathered by the centralized server may be used to route traffic to these other applications efficiently as well.

Global Load Balancer Using Measurement-Based Data

An example follows of how a global load balancer uses the measurement-based data. Global load balancing is performed when a client requests to visit a particular web page. A DNS lookup is performed to translate the website URL entered by the client (e.g. "www.sampledomain.com") into an IP address (e.g. "1.2.3.4"). The lookup is directed to an authoritative name server (that is also a global load balancer). The global load balancer examines the requesting IP address. The requesting IP address is then compared to the information for that particular netblock, or range of IP addresses, out of the sorted measurement-based data. The global load balancer selects the first available web server on the list sorted by various TCP statistics such as network latency and packet loss and returns the IP address of the web server to the client. The client is thus routed to the web server with the best available TCP connectivity.

An illustration of processed data sorted by netblock, according to an embodiment of the invention, is shown in FIG. 3. The data has "Client" column 300, "Colocation A" column 302, "Colocation B" column 304, and "Colocation C" column 306. "Client" column 300 lists the IP addresses of the clients to which each of the colocations connect. In an embodiment, clients are listed in netblocks. In row 308, the netblock "1.1.1.0/24" indicates a subnet mask of 24 with clients at the IP address "1.1.1.x" where x can be any number between 0-255. If a client wishes to connect to a colocation from this netblock, then connecting to colocation A takes 10 ms, connecting to colocation B takes 50 ms, and connecting to colocation C takes 80 ms. Thus, a client from netblock "1.1.1.0" would be closest to colocation A.

In row 310, the netblock "2.2.2.0/26" indicates a subnet mask of 26 with clients at the IP address "2.2.2.x" where x can be any number between 0-63. If a client wishes to connect to a colocation from this netblock, then connecting to colocation A takes 100 ms, connecting to colocation B takes 40 ms, and connecting to colocation C takes 5 ms. Thus, a client from netblock "2.2.2.0" would be closest to colocation C.

In row 312, the netblock "3.3.3.0/24" indicates a subnet mask of 24 with clients at the IP address "3.3.3.x" where x can be any number between 0-255. If a client wishes to connect to a colocation from this netblock, then connecting to colocation A takes 300 ms, connecting to colocation B takes 1 ms, and connecting to colocation C takes 500 ms. Thus, a client from netblock "3.3.3.0" would be closest to colocation B.

Closed Circuit Feedback

In an embodiment, a closed circuit feedback loop is generated that is able to dynamically respond to changes in Internet topology and performance. As shown above, a global load balancer routes a client to a particular web server to fetch web content. The global load balancer determines routing based on measurements of TCP connections from retrieving web beacons.

When the client receives the web page content from the server, the web page content contains beacon code instructing the client to retrieve web beacons from each data center once again. By continuously gaining more measurements and statistics from web beacon TCP connections, the connection quality measurement system is able to quickly self-correct for situations that affect network availability. These situations include, but are not limited to, fiber cuts, equipment problems, server failover, or capacity problems.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to measure connection quality from a plurality of data centers to end-user-clients, comprising:
   receiving, at an aggregator, a distinct set of connection quality measurements for each end-user-client/data-center combination;
   wherein a connection quality measurement for an end-user-client/data-center combination includes measures of connection quality between (a) an end-user-client, and (b) a data-center;
   determining and grouping, at the aggregator, said end-user-clients into netblocks based on IP addresses of said end-user-clients;
   for each of the netblocks, the aggregator generating aggregated connection quality measurements data by aggregating the distinct sets of connection quality measurements for those end-user-clients that belong to the netblock;
   outputting, from the aggregator, to a plurality of load balancing servers, said aggregated connection quality measurements data for use by said load balancing servers in determining how to route messages between said end-user-clients and said data-centers;
   wherein the method is performed by one or more computing devices.

2. The method of claim 1, wherein the measures of connection quality are based upon TCP connections from the end-user-clients to a plurality of beacon servers, wherein each of the plurality of beacon servers corresponds to one of the plurality of data centers.

3. The method of claim 2, wherein the TCP connections are the result of web beacon code served to each of the plurality of end-user-clients.

4. The method of claim 1, wherein the aggregated connection quality measurements data is organized into groups where, for each group, IP addresses of the end-user-clients are within a particular range of IP addresses.

5. The method of claim 4, wherein the aggregated connection quality measurements data groups comprise data centers sorted by connection quality to the particular range of IP addresses.

6. The method of claim 1, wherein the measures of connection quality comprise network latency.

7. The method of claim 1, wherein the measures of connection quality comprise packet loss ratio.

8. The method of claim 2, wherein the TCP connections are from end-user-clients retrieving zero-content images from each of the plurality of data centers corresponding to one of the plurality of data centers.

9. A method comprising:
   storing, at an aggregator, from a server into a computer-readable non-transitory storage medium, a distinct set of connection quality measurements for each end-user-client/data-center combination;
   wherein a connection quality measurement for an end-user-client/data-center combination includes measures of connection quality between (a) an end-user-client, and (b) a data-center;
   determining and grouping, at the aggregator, said end-user-clients into netblocks based on IP addresses of said end-user-clients;
   for each of the netblocks, the aggregator generating aggregated connection quality measurements data by aggregating the distinct sets of connection quality measurements for those end-user-clients that belong to the netblock of a plurality of netblocks;
   wherein the netblock to which each end-user-client belongs is based on an IP address of the end-user-client;
   outputting, from the aggregator, to a plurality of load balancing servers, said aggregated connection quality measurements data for use by said plurality of load balancing servers in determining how to route messages between said end-user-clients and said data-centers;
   wherein the method is performed by one or more computing devices.

10. A method to measure connection quality from a plurality of data centers to clients, comprising:
    receiving, at an aggregator, requests from a plurality of end-user-clients;
    storing, at the aggregator, a distinct set of connection quality measurements for each end-user-client/data-center combination generated based upon the requests;
    determining and grouping, at the aggregator, said end-user-clients into netblocks based on IP addresses of said end-user-clients;
    outputting, from the aggregator, to a plurality of load balancing servers, aggregated connection quality measurements data for use by said load balancing servers in determining how to route messages between said end-user-clients and said data-centers;
    wherein the aggregator generates said aggregated connection quality measurements data for each of the netblocks by aggregating the distinct sets of connection quality measurements for those end-user-clients that belong to the netblock;
    wherein the method is performed by one or more computing devices.

11. A system comprising,
    a first plurality of servers, each particular server of the first plurality of servers located in a particular data center, of a plurality of data centers, wherein the first plurality of servers measures connection quality measurements for each end-user-client/data-center combination, and generates a distinct set of connection quality measurements for said each end-user-client/data-center combination;

wherein a connection quality measurement for an end-user-client/data-center combination includes, measures of connection quality between (a) an end-user-client, and (b) a data-center;

an aggregation server, wherein the aggregation server receives said distinct set of connection quality measurements for each end-user-client/data-center combination from said first plurality of servers; determines and groups said end-iser-clients into netblocks based on IP addresses of said end-user-clients; for each of the netblocks, generates aggregated connection quality measurements data by aggregating the distinct set of connection quality measurements for those end-user-clients that belong to the netblock; and a second plurality of servers, wherein the second plurality of servers receives said aggregated connection quality measurements data for use in determining how to route messages between said end-user-client and said data-centers.

12. A computer-readable non-transitory storage medium storing one or more sequences of instructions which, when executed by one or more processors, cause the one or more processors to:

receive, at an aggregator, a distinct set of connection quality measurements for each end-user-client/data-center combination;

wherein a connection quality measurement for an end-user-client/data-center combination includes measures of connection quality between (a) an end-user-client, and (b) a data-center;

determine and group, at the aggregator, said end-user-clients into netblocks based on IP addresses of said end-user-clients;

generate, for each of the netblocks, at the aggregator, aggregated connection quality measurements data by aggregating the distinct sets of connection quality measurements for those end-user-clients;

output, from the aggregator, to a plurality of load balancing servers, said aggregated connection quality measurements data for use by said load balancing servers in determining how to route messages between said end-user-clients and said data-centers.

13. The computer-readable storage medium of claim 12, wherein the measures of connection quality are based upon TCP connections from the end-user-clients to a plurality of beacon servers, wherein each of the plurality of beacon servers corresponds to one of a plurality of data centers.

14. The computer-readable storage medium of claim 13, wherein the TCP connections are the result of web beacon code served to each of the plurality of end-user-clients.

15. The computer-readable storage medium of claim 12, wherein the aggregated connection quality measurements data is organized into groups where IP addresses of the end-user-clients are within a particular range of IP addresses.

16. The computer-readable storage medium of claim 15, wherein the aggregated connection quality measurements data groups comprise data centers sorted by connection quality to the particular range of IP addresses.

17. The computer-readable storage medium of claim 12, wherein the measures of connection quality comprise network latency.

18. The computer-readable storage medium of claim 12, wherein the measures of connection quality comprise packet loss ratio.

19. The computer-readable storage medium of claim 13, wherein the TCP connections are from end-user-clients retrieving zero-content images from each of the plurality of data centers corresponding to one of a plurality of data centers.

20. The method of claim 9, wherein the measures of connection quality are based upon TCP connections from the end-user-clients to a plurality of beacon servers, wherein each of the plurality of beacon servers corresponds to one of the plurality of data centers.

21. The method of claim 9, wherein the TCP connections are the result of web beacon code served to each of the plurality of end-user-clients.

22. The method of claim 9, wherein the aggregated connection quality measurements data is organized into groups where, for each group, IP addresses of the end-user-clients are within a particular range of IP addresses.

23. The method of claim 10, wherein the measures of connection quality are based upon TCP connections from the end-user-clients to a plurality of beacon servers, wherein each of the plurality of beacon servers corresponds to one of the plurality of data centers.

24. The method of claim 10, wherein the TCP connections are the result of web beacon code served to each of the plurality of end-user-clients.

25. The method of claim 10, wherein the aggregated connection quality measurements data is organized into groups where, for each group, IP addresses of the end-user-clients are within a particular range of IP addresses.

26. The system of claim 11, wherein the measures of connection quality are based upon TCP connections from the end-user-clients to a plurality of beacon servers, wherein each of the plurality of beacon servers corresponds to one of the plurality of data centers.

27. The system of claim 11, wherein the TCP connections are the result of web beacon code served to each of the plurality of end-user-clients.

28. The system of claim 11, wherein the aggregated connection quality measurements data is organized into groups where, for each group, IP addresses of the end-user-clients are within a particular range of IP addresses.

* * * * *

UNITED STATES PATENT AND TRADEMARK OFFICE
CERTIFICATE OF CORRECTION

| | | |
|---|---|---|
| PATENT NO. | : 7,962,631 B2 | Page 1 of 1 |
| APPLICATION NO. | : 11/963700 | |
| DATED | : June 14, 2011 | |
| INVENTOR(S) | : Michael F. Christian et al. | |

It is certified that error appears in the above-identified patent and that said Letters Patent is hereby corrected as shown below:

COLUMN 11

Claim 11: Line 7, delete "," after includes

Signed and Sealed this
Second Day of August, 2011

David J. Kappos
*Director of the United States Patent and Trademark Office*